US011591271B2

(12) United States Patent
Näsholm et al.

(10) Patent No.: US 11,591,271 B2
(45) Date of Patent: Feb. 28, 2023

(54) FERTILIZER COMPOSITION

(71) Applicant: AREVO AB, Umeå (SE)

(72) Inventors: Torgny Näsholm, Umeå (SE); Mattias Holmlund, Umeå (SE); Jonas Öhlund, Umeå (SE)

(73) Assignee: AREVO AB, Umea (SE)

(*) Notice: Subject to any disclaimer, the term of this patent is extended or adjusted under 35 U.S.C. 154(b) by 141 days.

(21) Appl. No.: 16/301,130

(22) PCT Filed: May 16, 2017

(86) PCT No.: PCT/SE2017/050505
§ 371 (c)(1),
(2) Date: Nov. 13, 2018

(87) PCT Pub. No.: WO2017/200468
PCT Pub. Date: Nov. 23, 2017

(65) Prior Publication Data
US 2019/0177241 A1 Jun. 13, 2019

(30) Foreign Application Priority Data

May 16, 2016 (SE) .................................. 1650655-2
Oct. 24, 2016 (SE) .................................. 1651388-9

(51) Int. Cl.
C05C 11/00 (2006.01)
C05B 17/00 (2006.01)
(Continued)

(52) U.S. Cl.
CPC .............. C05C 11/00 (2013.01); C05B 17/00 (2013.01); C05F 11/10 (2013.01); C05G 1/00 (2013.01); C05F 11/00 (2013.01)

(58) Field of Classification Search
CPC ........... C05F 11/00; C05F 11/02; C05F 11/10; C05G 1/00; C05G 5/30; C05G 5/37; C05G 3/00; C05C 11/00; C05B 17/00
See application file for complete search history.

(56) References Cited

U.S. PATENT DOCUMENTS 4,006,004 A    2/1977  Seferian et al.
7,776,124 B2*  8/2010  Binder .................... C05F 11/08
                                                              71/6

(Continued)

FOREIGN PATENT DOCUMENTS

CN    102765986 A    11/2012
CN    104119146 A    10/2014
(Continued)

OTHER PUBLICATIONS

Mackenzie A., "What Can You Use to Promote Root Growth?", 2013, accessed from https://web.archive.org/web/20131115124807/ https://homeguides.sfgate.com/can-use-promote-root-growth-75498.html (Year: 2013).*

(Continued)

*Primary Examiner* — Jennifer A Smith
(74) *Attorney, Agent, or Firm* — Porter Wright Morris & Arthur LLP

(57) ABSTRACT

The present invention relates to a fertilizer comprising at least one basic L-amino acid, such as arginine or lysine, wherein a substantial portion of the basic L-amino acid content is present as its monophosphate. The basic L-amino acid phosphate may be combined with a binder and/or provided with an outermost layer acting as a coating. The invention also relates to a method of enhancing the growth of a plant by making a basic L-amino acid phosphate available to the plant.

16 Claims, 13 Drawing Sheets

(51) Int. Cl.
  *C05F 11/10* (2006.01)
  *C05G 1/00* (2006.01)
  *C05F 11/00* (2006.01)

(56) References Cited

U.S. PATENT DOCUMENTS

| | | |
|---|---|---|
| 2008/0134737 A1 | 6/2008 | Binder et al. |
| 2010/0035308 A1 | 2/2010 | Summer et al. |
| 2014/0245800 A1 | 9/2014 | Näsholm et al. |
| 2016/0081336 A1 | 3/2016 | Hartle et al. |
| 2017/0036965 A1 | 2/2017 | Näsholm et al. |

FOREIGN PATENT DOCUMENTS

| | | |
|---|---|---|
| EP | 0509030 A1 | 10/1992 |
| JP | 2003-171196 A | 6/2003 |
| JP | 2009-511416 A | 3/2009 |
| JP | 2009096647 A | 5/2009 |
| JP | 2009-184874 A | 8/2009 |
| JP | 2011-507788 A | 3/2011 |
| WO | 2007/047350 A2 | 4/2007 |

OTHER PUBLICATIONS

College of Tropical Agriculture and Human Resources ("Soil Composition", 2008, accessed from ctahr.hawaii.edu, referenced hereinafter as "CTAHR") (Year: 2008).*

Psu, "Fertilizer Carrier", 2016, accessed from personal.psu.edu (Year: 2016).*

Lum et al ("Characterization of Urea Encapsulated by Biodegradable Starch-PVA-Glycerol", J Polym Environ (2013) 21:1083-1087) (Year: 2013).*

Singh, Shivani, and Bansi Lal. "Crystalline fiber growth of dye-doped L-arginine phosphate by the laser-heated pedestal growth technique." Journal of crystal growth 310.7-9 (2008): 2039-2042. (Year: 2008).*

Urbaneja, G. et al., Acid hydrolysis and carbohydrates characterization of coffee pulp, vol. 9, Issues 1-4, pp. 1041-1044 (1996).

ChemSpider, Royal Society of Chemistry, www.chemspider.com/chemical-structure.7989831 (2015).

SweTree Technologies, D-amino acid technology, pp. 1-2 (Jun. 22, 2016).

Ting, Guan, An Overview of Peat Related Chemistry, Thesis, Centria University of Applied Sciences, Degree Programme in Chemistry and Technology (Apr. 2015).

Supplementary European Search Report dated Dec. 12, 2019 from corresponding European Application No. 17799772.3.

Official Office Action from corresponding Japanese Application No. 2018560454 dated Mar. 16, 2021, with English Translation.

Dong, Xu et al., A New Phase Matchable Nonlinear Optic Crystal L-Abginine Phosphate Monohydrate, Acta Chimica Sinica, vol. 41, No. 6, pp. 1-5 (Jun. 1983), with English Abstract.

Official Office Action from corresponding Chinese Application No. 201780029969.3, dated Feb. 1, 2021, with English Translation.

Official Office Action from corresponding Korean Application No. 10-2018-7036428 dated Sep. 23, 2021.

* cited by examiner

FERTILIZER COMPOSITION

TECHNICAL FIELD

The present invention relates to a fertilizer capable of enhancing the growth of plants, a method of enhancing the growth of a plant by making said fertilizer available to a seed or to a plant, and the use of certain amino acid phosphates as fertilizers.

BACKGROUND

Methods of improving soil and/or growth conditions have in principle been applied since the first days of agriculture and horticulture. Starting with a very limited understanding of mechanisms, it was recognised that the waste from the household animals such as cows improved the growth of crops in the fields. As nitrogen, potassium and phosphorus were identified as the key components required to efficiently fertilize the soil, commercial preparations became widely available and the principle of more is less was generally applied for decades, resulting in the by now well-known over fertilization effects. While preparations including nitrogen, potassium and phosphorus together with various other mineral nutrients still constitute the standard in most plant culture, research is continuously improving with regard to the refinement of fertilizer compositions to provide plants with what is needed for their optimal growth. Specifically designed compositions for certain plants have been developed, and different formats such as liquids and dry preparations are also provided in order to balance a desired growth, feasibility of application and a minimal environmental impact.

One way to decrease the harmful environmental effects of fertilizers, and especially the losses of mineral nutrients to recipient ecosystems, is to develop compositions which provide a slow or delayed release of active component(s). Such compositions are often referred to as controlled-release preparations.

Coating of mineral nutrient salts has been proposed as one way of slowing down release. As a common mechanism, coatings have usually acted simply to delay the release of the enclosed nutrients—in the early stages, the coating has prevented any release of nutrient, and once 'opened' or consumed, the nutrients all became available at once. In theory, such released nutrients could either be utilized by the cultured plant, or, if the amount is more than needed, it could leak to the environment. In extreme cases, a large dose of nutrient or fertiliser composition may be toxic to the plant.

Thus, an ongoing challenge in coating technology is to provide for a release which is extended to a prolonged period of time, at a rate which is adapted to the needs of the cultured plant.

EP 0509030 relates to a solid fertilizer composition comprising micronutrients in the form of metal salts together with at least one water-soluble nitrate. A method is described which includes preparing the micronutrient fertilizer composition in the form of dry aggregate bodies which are adapted to be mixed with a macronutrient fertilizer composition, the method comprising dry mixing without any substantial addition of water salts of at least 2 metals selected from the group consisting of Cu, Mn, Zn, Co and Mo as well as at least one water-soluble nitrate which is not in the form of a salt of said metals. The ratio between said micronutrients and said macronutrients should be substantially above the ratio in which said micronutrients and said macronutrients are required by crop plants, to obtain an intimately mixed micronutrient mixture. The resulting micronutrient mixture is combined with a binder to obtain said micronutrient fertilizer composition in the form of dry aggregate bodies.

Despite the teachings of the prior art, there is still a need in this area for alternative fertilizer compositions, which avoid or at least reduce the above-discussed toxicity that is sometimes associated to the administration of large amounts of nutrients in one giving. There is also a need for novel fertilizer compositions which provide for sustained release of nutrient(s), and hence are suitable for less frequent additions to growing plants.

SUMMARY OF THE INVENTION

The present invention relates to novel fertilizers, which fulfil one or more of the above discussed needs.

Thus, the invention relates to a fertilizer comprising at least one basic L-amino acid, which fertilizer is a solid composition wherein a substantial portion of the basic L-amino acid content is present as a monophosphate thereof.

Further, the invention relates to a method of enhancing the growth of a plant, which method comprises making a fertilizer according to the invention available to a seed or a plant.

Finally, the invention relates to a monophosphate of a basic L-amino acid for use as a fertilizer.

Additional embodiments, details and advantages of the present invention will appear from the dependent claims and the detailed description and experimental part that follow below. All embodiments presented and indicated herein are applicable to all of the aspects of the invention.

DEFINITIONS

The term "plant" is used herein in a broad sense to denote a species or kind of plant.

The term "amino acid" as used herein includes derivatives or modified forms thereof.

The term "phosphate" is used herein in its conventional meaning, i.e. for salts or esters of tetrahedral $PO_4$ (phosphate) structural units.

The term "arginine monophosphate", or "ArgP", is sometimes used herein for the monophosphate of arginine.

The term "lysine monophosphate", or "LysP", is sometimes used herein for the monophosphate of lysine.

DETAILED DESCRIPTION OF THE INVENTION

Figure 1:
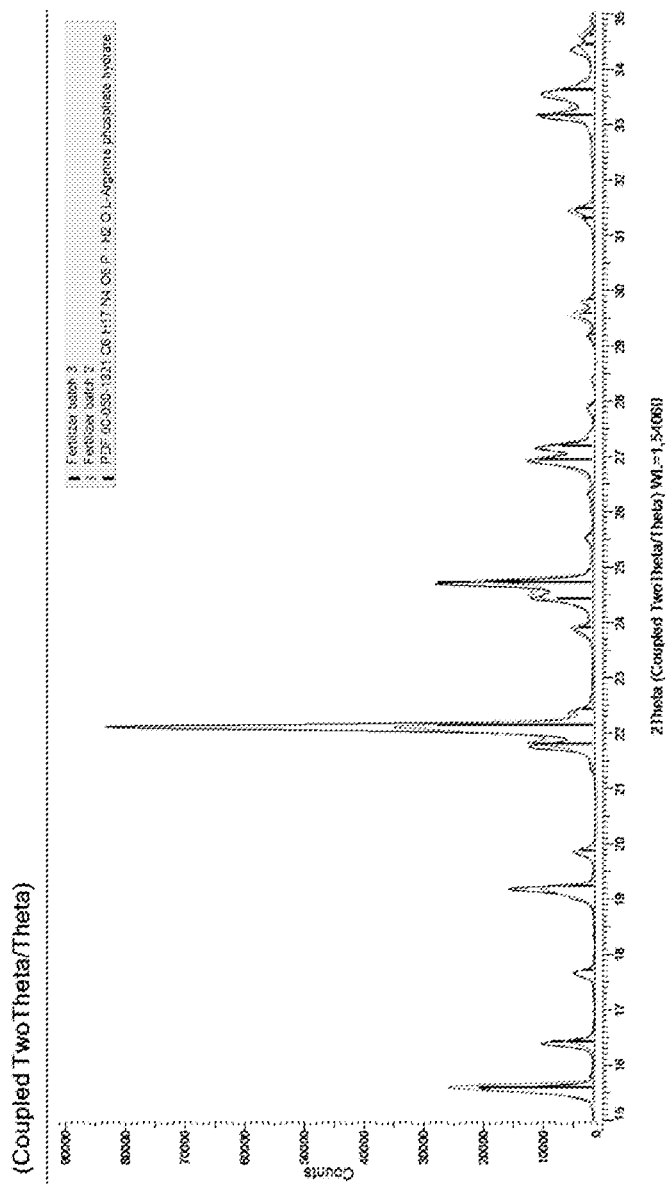
FIG. 1 shows the XRD diffractogram of L-arginine phosphate monohydrate crystals prepared according to the invention.

A first aspect of the present invention is a fertilizer comprising at least one basic L-amino acid, which fertilizer is a solid composition wherein a substantial portion of the basic L-amino acid content is present as at least one monophosphate thereof. In the present context, the term "a substantial portion" means that the fertilizer is comprised of a monophosphate of at least one basic L-amino acid as its predominant source of organic nitrogen. Thus, small amounts of other phosphates may be present, such as polyphosphates remaining from the preparation.

In one embodiment, the fertilizer comprises a monophosphate of at least one basic L-amino acid, and no other phosphate(s).

The basic L-amino acid used according to the invention may be L-arginine; L-lysine; or L-histidine. In one embodiment, the basic L-amino acid is L-arginine and/or L-lysine. In this context, it is to be understood that the amino acids used in the present invention may include modified forms of basic L-amino acids, provided that they have maintained the herein discussed properties for providing nitrogen to seeds or plants. Basic L-amino acids are available from commercial sources. In an advantageous embodiment, the basic L-amino acid is arginine, and the fertilizer is comprised of arginine monophosphate optionally together with additional nutrient(s) and/or binder(s), as discussed below.

Monophosphates of basic L-amino acids are easily prepared by the skilled person following well known methods. In one embodiment, the present amino acid monophosphate (s) are crystalline i.e. salts. In an alternative embodiment, covalent coupling is used to prepare the present amino acid monophosphate(s).

Two illustrative ways of controlled preparation of monophosphates will be provided below in the experimental part (see Example 1 and 6). Alternatively, as the skilled person will appreciate, salts of basic L-amino acids may be formed by spontaneous precipitation from a liquid having an undefined content of amino acid(s) and phosphate(s), optionally together with other components.

In one embodiment, the fertilizer according to the invention further comprises at least one binder. Binders suitable for the preparation of fertilizers are well known in this area, and the skilled person can easily select an appropriate material.

As will appear from the experimental part below, the fertilizer according to the invention has been shown to substantially avoid the toxicity sometimes associated with large quantities of conventional fertilizer compositions. Without wishing to be bound to any specific theory, as the plants to which the fertilizer according to the invention show an enhanced growth during prolonged periods of time, the chemical composition of the fertilizer appears to prevent substantial loss of nitrogen to the environment. In other words, the fertilizer according to the invention can be regarded as a slow release-type of fertilizer composition.

More specifically, the above-mentioned binder may comprise mineral(s) and/or natural or synthetic polymers.

In one embodiment, the binder is selected from the group consisting of polymers, such as a synthetic polymer or a natural polymer, e.g. a sugar or a carbohydrate; salts; and minerals.

In a specific embodiment, the binder is a water-soluble polymer, such as polyvinyl alcohol (PVA).

In another embodiment, the binder is selected from the group consisting of starches and sugars.

In yet another embodiment, the binder is selected from the group consisting of calcium-containing salts and calcium-containing minerals.

Having selected a suitable binder, the skilled person can design an appropriate physical format of the present fertilizer using well known principles of aggregation and coating, or variations thereof. Some guidance to advantageous formats will be discussed below.

The fertilizer according to the invention may be prepared from a plurality of aggregates, wherein each one or most of the aggregates comprise particles comprising basic L-amino acid(s) which have been aggregated together by mixture with a binder. In this context, the term "mixture with" means simply that the particles have been combined with the binder in a way that holds them together into aggregate(s). As the skilled person will appreciate, in order to prepare particles comprising amino acid monophosphate, a nucleus-forming agent may be used. Such agents are well known in the area, and may for example be a non-reactive material such as clay.

Thus, in one embodiment of the present fertilizer, the particles are comprised by one or more nuclei surrounded by the basic L-amino acid monophosphate(s).

As discussed in the section background above, conventional fertilizer compositions are sometimes coated with an outer layer denoted a "coating", which protects nutrients and/or delays the release thereof. The present fertilizer may comprise such a "coating", the thickness of which may be varied and adjusted depending on the other parameters of the fertilizer.

Thus, in one embodiment, the fertilizer according to the invention is comprised of a plurality of the above-described aggregates enclosed by an outermost layer the composition of which differs from the material enclosed by said layer. In this embodiment, as an example, the outermost layer may be a mixture of a binder with the herein-described amino acid monophosphate(s). By including a certain amount of amino acid monophosphate in the coating, the fertilizer may provide for early release of nutrient in addition to the delayed release of its inner contents.

In an alternative embodiment, the fertilizer according to the invention comprises an outermost layer of binder only, and no amino acid monophosphate. Alternatively, a first binder may be used to form the aggregates comprising amino acid monophosphate(s), with or without the use of a nucleus-forming agent, while a second binder being of a different nature from the first binder may be used to form an outermost layer.

As will be clear to the skilled person in this area, various embodiments may be provided based on these principles. For example, basic L-amino acid monophosphate may be mixed with binder with or without nucleus-forming agents, and be enclosed e.g. by one of the outermost layers discussed above. Further, additional nutrients may be added to the present fertilizer, either as a component of the particles, as mixed with the binder, and/or as part of the outermost layer.

Furthermore, other additives conventionally used to improve the texture, preservation or other properties of fertilizer compositions may also be incorporated in the present fertilizer.

Further, in addition to the nutrients already provided by the monophosphate of at least one basic L-amino acid, the fertilizer according to the invention may comprise e.g. potassium, other nitrogen and/or phosphate sources, micro nutrients vitamins, minerals and trace elements or other growth enhancing compounds, as appropriate.

The fertilizer according to the invention is a solid preparation. In this context, it is to be understood that the term "solid" is to be understood as opposed to a liquid composition. Thus, for example, the humidity of the aggregates within the outermost layer may be higher than the outermost layer itself. As the skilled person will appreciate, the nature of the binder(s) used as well as the method of preparation will affect the degree of solidity of the fertilizer according to the invention. In one embodiment, the fertilizer according to the invention is solid in the sense that it retains its shape and density when not confined.

A second aspect of the invention is a method of enhancing the growth of a plant, which method comprises making a solid fertilizer, which comprises at least one basic L-amino acid and wherein a substantial portion of the basic L-amino acid content is present as a monophosphate thereof, available to a seed or a plant.

In an advantageous embodiment, the second aspect of the invention uses a fertilizer according to the invention, as defined in any of the embodiments above separate or combined with each other.

In one embodiment, the availability of nitrogen and optionally other nutrients to a plant is controlled by arranging a seed in a growth-supporting material, such as mineral, soil or peat, optionally compressed, to which the fertilizer has been added. Thus, the present invention also embraces a product which comprises a growth-supporting material supplemented with a suitable amount of fertilizer according to the invention, which product is arranged to receive a seed. The growth-supporting material may be dried, to allow for subsequent wetting. By wetting the material, a fertilized environment will be provided to each seed supporting and enhancing its growth by making available required nutrients, especially N and P, at the rate with which the seedling or plant requires it. Pre-fertilized growth-supporting materials according to the invention may be prepared in shapes and sizes appropriate for automated or semi-automated plantation.

In one embodiment of the present method, the growth of plant roots is specifically enhanced. In this context, it is to be understood that even if the growth above ground is also stimulated according to the invention, the present method provides for a more pronounced increase of plant roots than the prior art fertilizers, as will appear from the experimental part below. Thus, without wishing to be bound to any specific theory, it may be speculated that the increase in root growth observed when using the invention in turn favours the plant growth above ground too.

A third aspect of the invention is a monophosphate of a basic L-amino acid for use as a fertilizer. In one embodiment, the monophosphate of a basic L-amino acid has been combined with a binder, e.g. in any of the ways discussed above.

In this third aspect, the monophosphate of a basic L-amino acid may be for any of the more specific uses discussed above and elsewhere in the present application, such as for the enhancement of the growth of a plant during a prolonged period of time using a single giving or few givings of fertilizer, and/or for avoiding the toxicity sometimes associated with such givings.

DETAILED DESCRIPTION OF THE DRAWINGS

FIG. 1 shows the XRD diffractogram of L-arginine phosphate monohydrate crystals prepared according to the method described in example 1.

Figure 2:
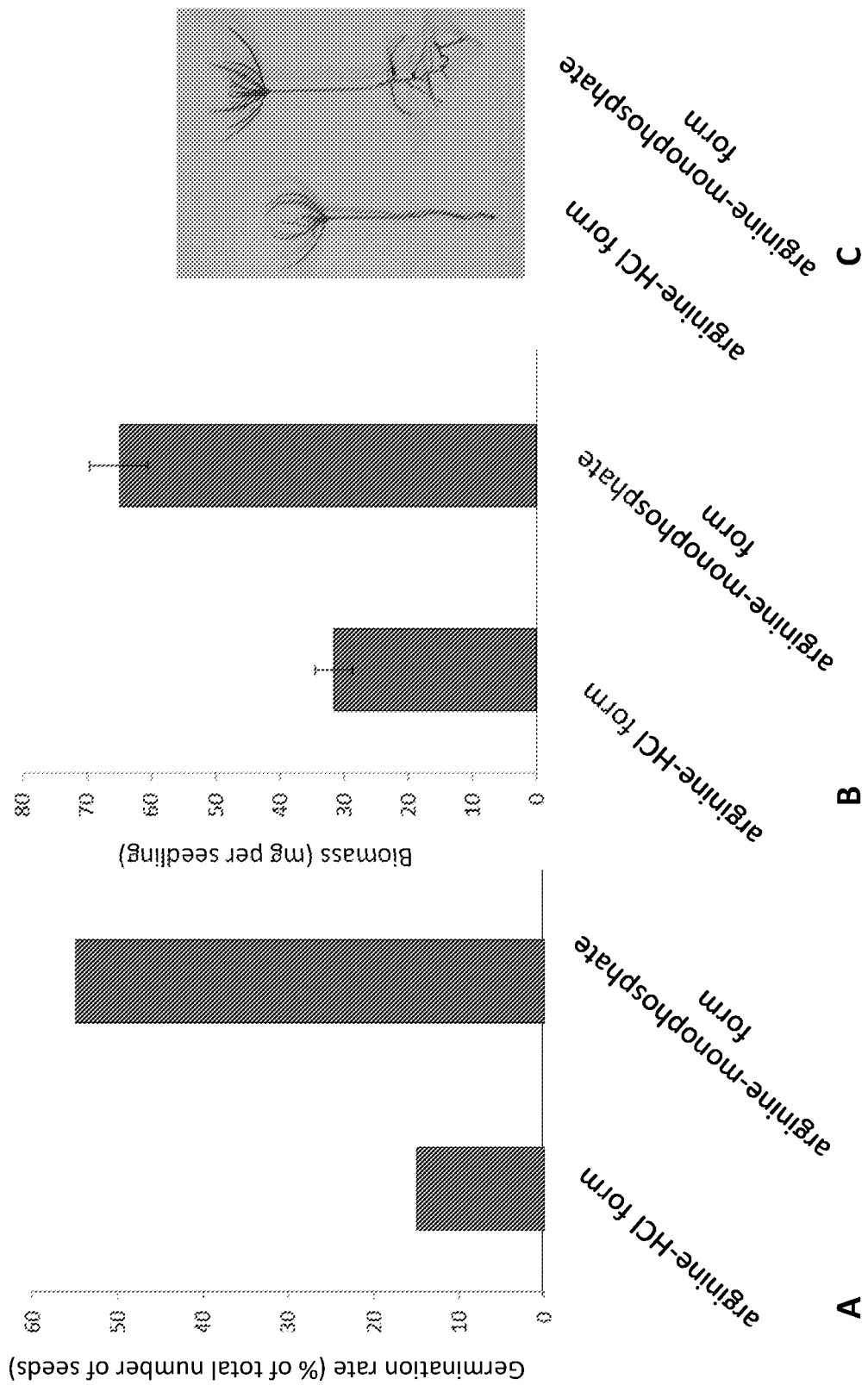
FIG. 2A-C shows the effect of germination and growth with different types of arginine-comprising compounds.

FIG. 2A-C shows the effect of germination and growth with different types of arginine-comprising compounds. 20 mg nitrogen in the form of Arg-HCL and arginine monophosphate (ArgP) was incorporated into peat and the effect on germination and growth was studied.

A) Germination of Scots pine (*Pinus sylvestris*) seedlings fertilized with Arg-HCL (left) or arginine monophosphate (right).

B) Dry weight of Scots pine (*Pinus sylvestris*) seedlings fertilized with Arg-HCL (left) or Arg monophosphate according to the invention (right).

C) Picture of Pine seedlings fertilized with Arg-HCl (left) or arginine monophosphate (right).

Thus, the solubility of the arginine monophosphate according to the invention positively affects growth and germination of pine seedlings. The more rapidly dissolving form of Arg complexes, here illustrated by Arg-HCl, leads to reduced germination and decreased growth of the seedlings, possibly as a result of nitrogen toxicity.

Figure 3:
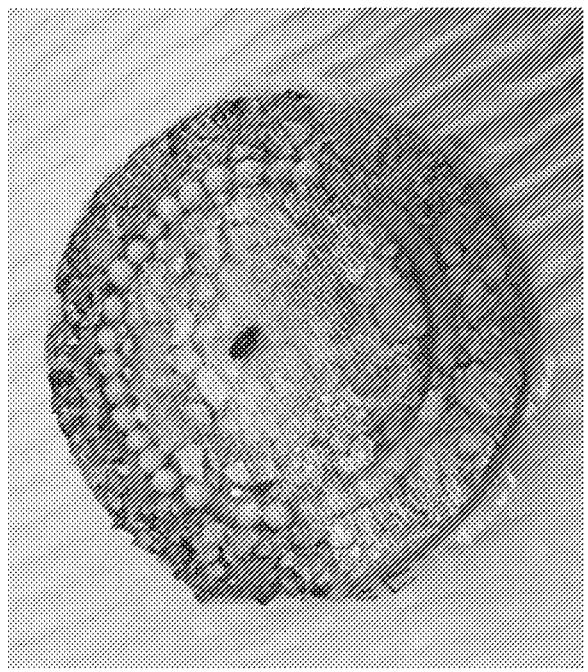
FIG. 3 shows an illustrative growth-supporting product with a seed and beads comprising an arginine monophosphate fertilizer according to the invention.

FIG. 3 shows a photograph of an illustrative growth-supporting material according to the invention provided with seed located in the centre and fertilizer in the form of beads comprising arginine monophosphate according to the invention placed in a groove.

Figure 4:
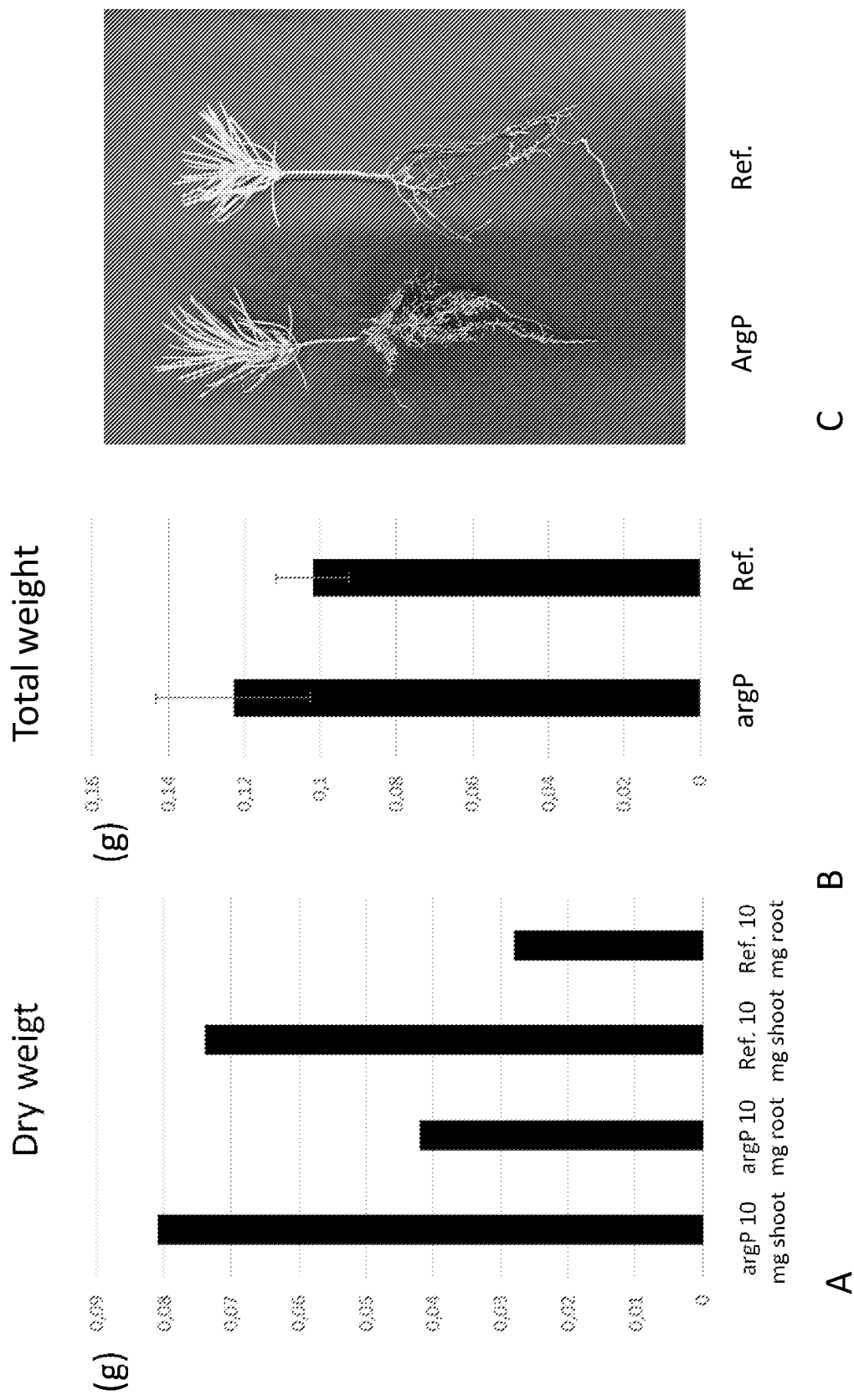
FIG. 4 shows the effect of growth when arginine monophosphate according to the invention is compared with a commercially available fertilizer composition.

FIG. 4 shows the result of Pine seeds grown on unfertilized peat with addition of 10 mg N from different arginine compositions mixed in the peat before germination. Pine seedlings were harvested at the end of the growing period (three months) and dry weight was measured. The figure shows a clear difference in growth depending on the form of the arginine.

Figure 5:
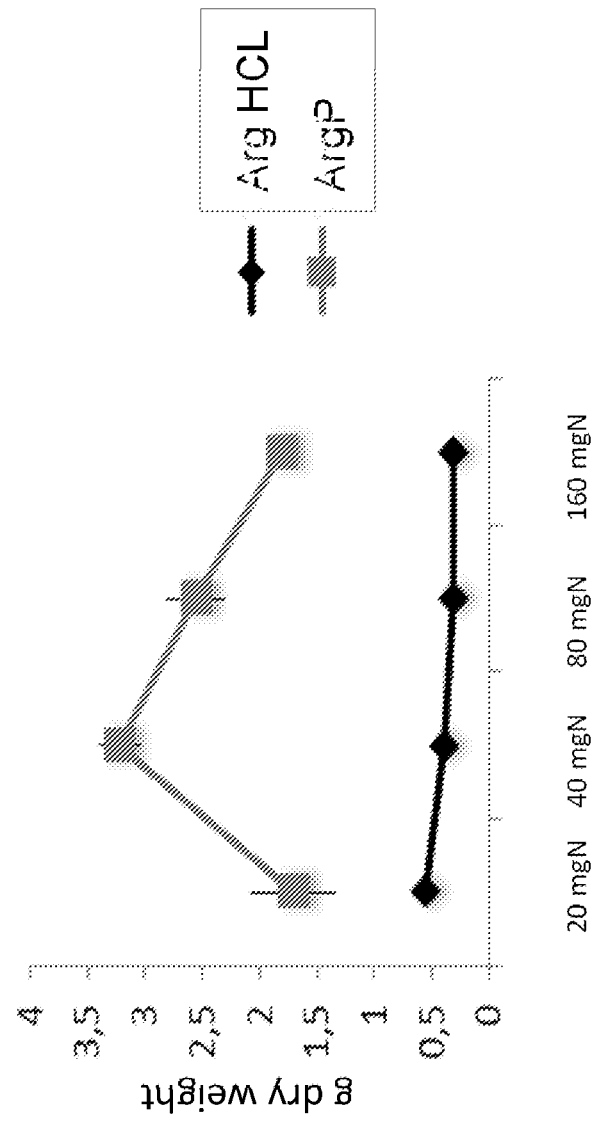
FIG. 5 shows the effect on growth of Pine seedlings with arginine-HCl and arginine monophosphate, respectively.

FIG. 5 shows the effect on growth with arginine-HCl and arginine monophosphate. Four single doses of different amounts of nitrogen (20, 40, 80 and 160 mg N, respectively) were added to Pine seedlings grown on unfertilized peat in the greenhouse for 10 weeks. Arginine monophosphate according to the invention is shown by the uppermost curve (■), and Arginine HCl(♦) below. As appears from this figure, with an equivalent coating, there is a substantial difference in growth between Arg HCl and the arginine monophosphate according to the invention.

Figure 6:
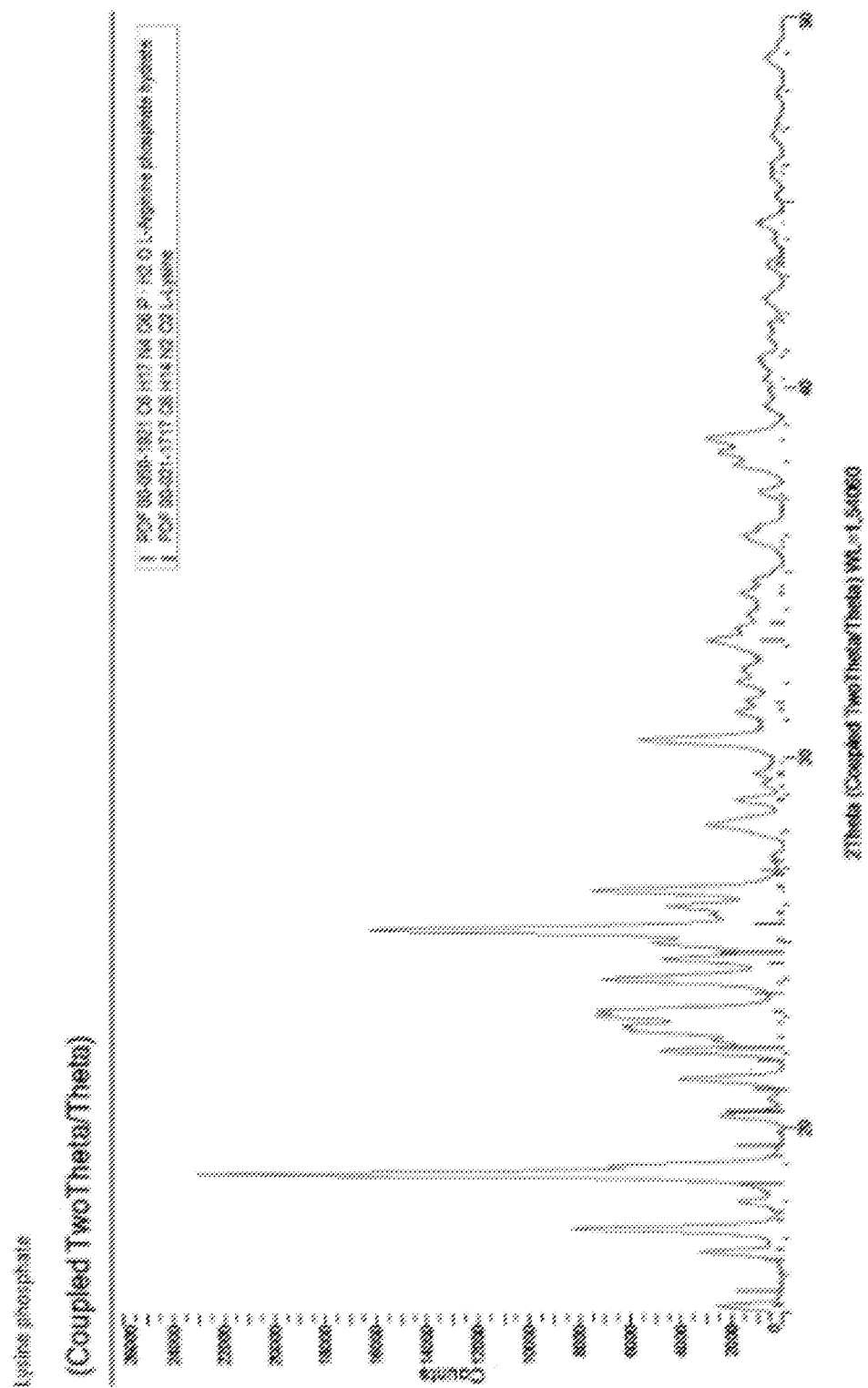
FIG. 6 shows the XRD diffractogram of lysine phosphate monohydrate crystals prepared according to the invention.

FIG. 6 shows the XRD diffractogram of lysine phosphate monohydrate crystals prepared according to the invention, see Example 6.

Figure 7:
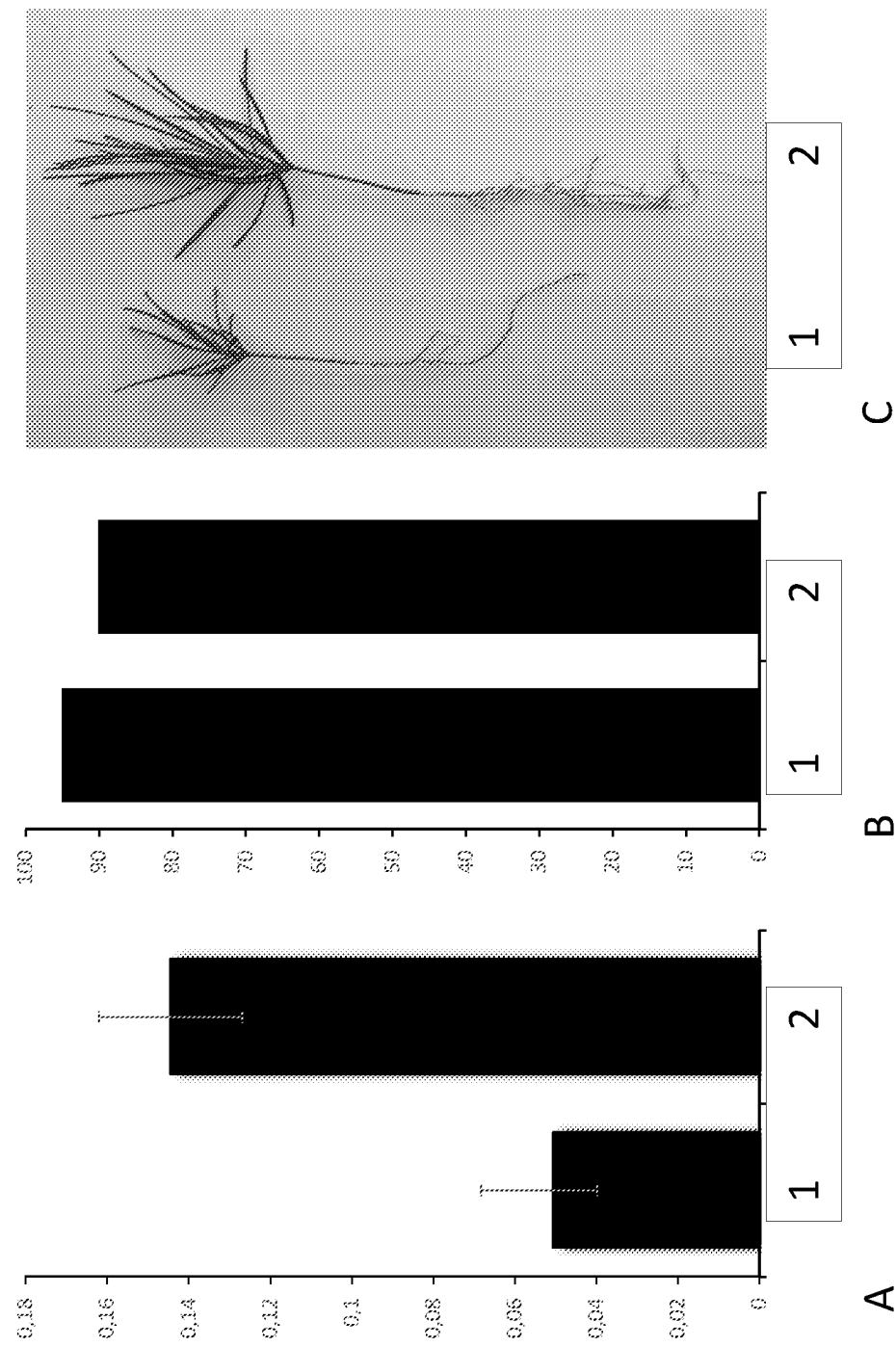
FIG. 7A-C shows the germination rate, the dry weight and a photo, respectively, of pine seedlings without (1) and with (2) lysine monophosphate fertilizer according to the invention.

FIG. 7A-C shows the growth of pine fertilized with lysine mono phosphate according to the invention. More specifically, in FIG. 7A, the germination rate, in FIG. 7B the dry weight in mg of the pine seedlings is shown and in FIG. 7C, a photo of the seedlings is seen. In FIG. 7, the digit "1" represent peat with no fertilizer and "2" peat with 20 mg N of lysine monophosphate according to the invention. This examples support the invention that a fertilizer comprising lysine monophosphate improves growth and germination of pine seedlings in a very positive way.

Figure 8:
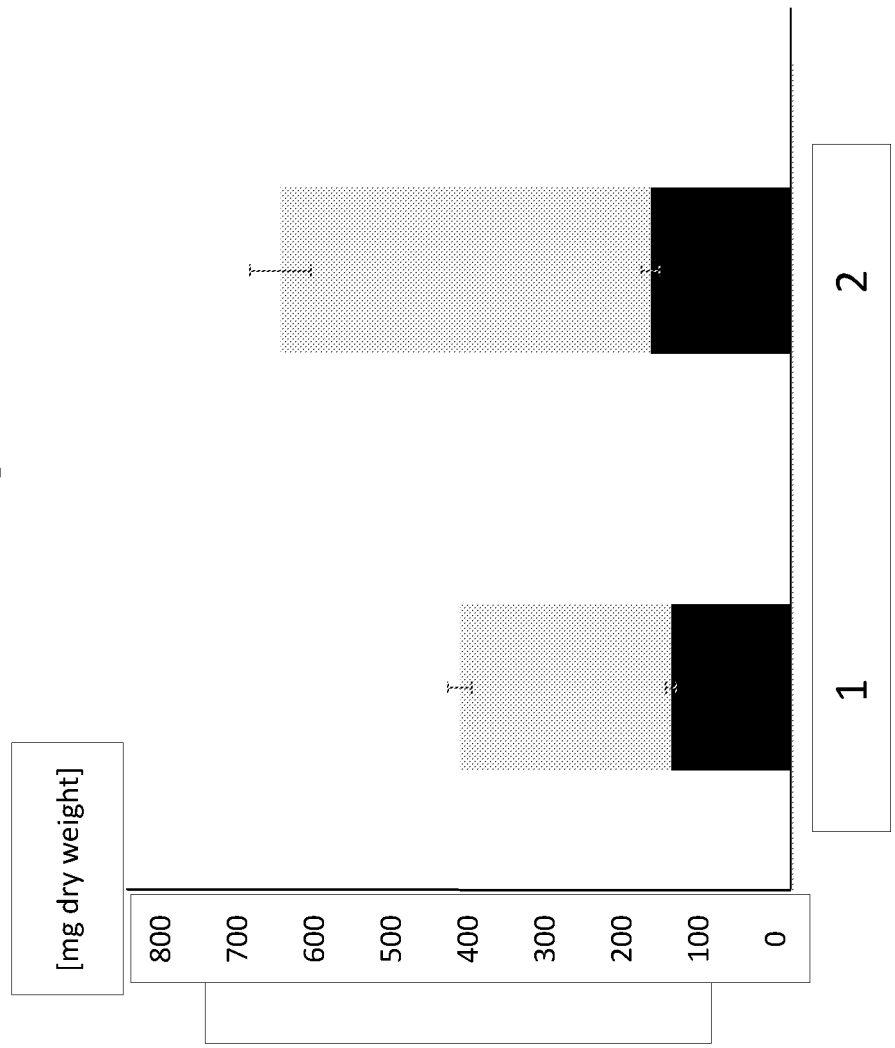
FIG. 8 shows the dry weight of shoots and roots of pine seedlings after one growth season.

FIG. 8 shows the dry weight of shoots and roots of seedlings after one growth season. The dry weight of shoots and roots of seedlings shown by the first bar (1) is based on the mean value (g dry weight) of approximately 4000 seedlings fertilized with arGrow™ mix and arGrow™ (both available from SweTree Technologies) complete according to the recommendations by the manufacturer. In the second bar (2), the dry weight is based on the mean value of approximately 2000 seedlings fertilized with coated arginine monophosphate according to the invention. In FIG. 8, the grey parts of the bars represent shoot, and the black parts of the bars represent root mean dry weights. As appears from the figures, there is a clear difference in dry weight of shoots and roots of seedlings depending on the form of the arginine supplied during a growth season. These results shows that the use of granulated arginine monophosphate provided seedlings with higher biomass and a larger portion shoot by dry weight than the seedlings fertilized with the commercial products arGrow™ mix and arGrow™ complete. An advantage with the use of the beaded format of the invention (i.e. the granulate) is that the fertilizer can be added from the start and that little or no additional fertilizer is needed, depending on the specific plant and its specific growth circumstances. Accordingly, the use of the invention may save resources as well as expenses.

Figure 9:
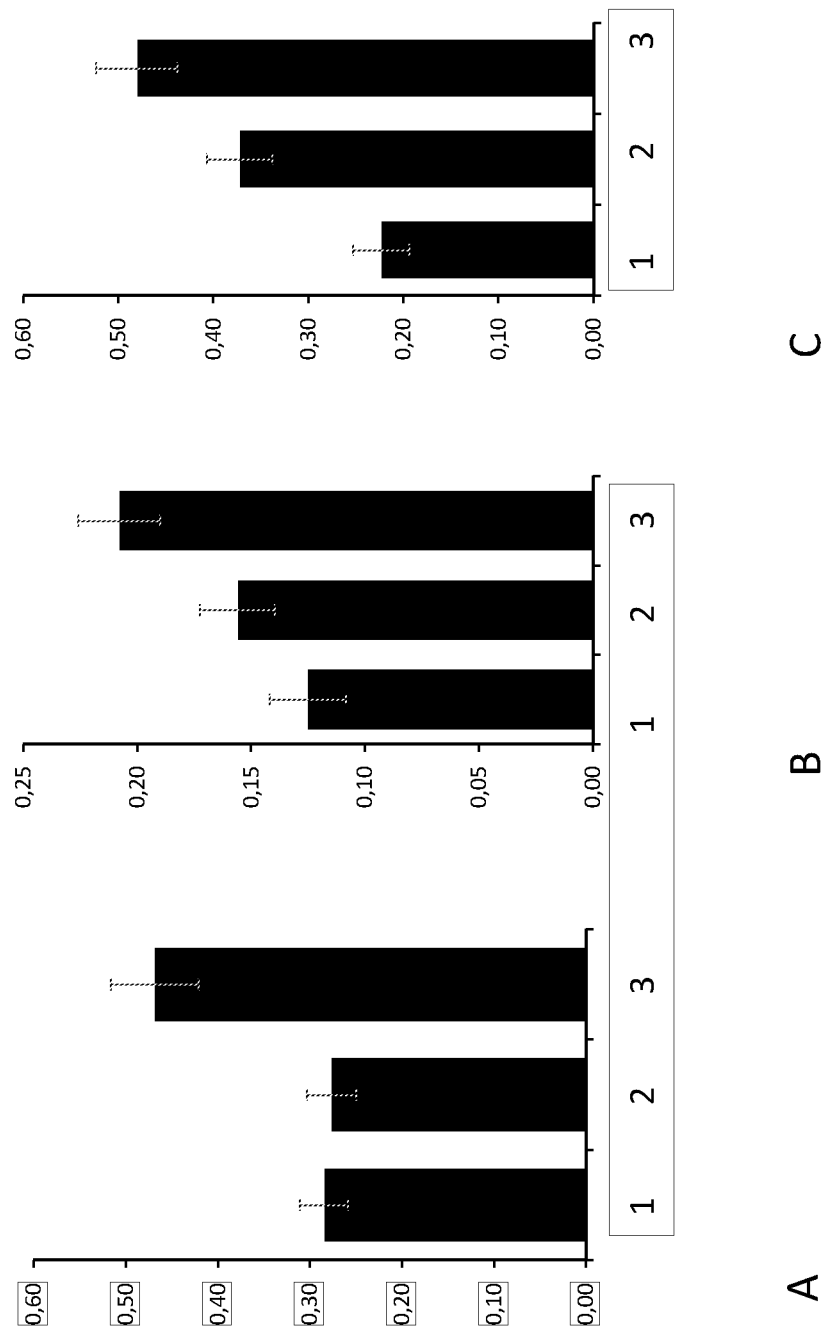
FIG. 9A-C show the total biomass of Scots pine (*Pinus sylvestris*), Norway spruce (*Picea abies*), and *Contorta* pine (*Pinus contorta*) and either without fertilizer (1), fertilized with a prior art product (2); or fertilized according to the invention (3).

FIG. 9 shows the total biomass of Scots pine (*Pinus sylvestris*), Norway spruce (*Picea abies*), and *Contorta* pine (*Pinus contorta*) plants after one growth season. FIG. 9A shows the total biomass of Scots pine (*Pinus sylvestris*); FIG. 9B shows the total biomass of Norway spruce (*Picea abies*); and FIG. 9C shows the total biomass of *Contorta* pine (*Pinus contorta*). In FIGS. 9A-C: 1 means no fertilizer supplied; 2 means fertilized with coated arginine-HCl beads; and 3 means granulated arginine monophosphate beads according to the invention. These results show that the use of coated granulated arginine monophosphate according to the invention resulted in plants with higher biomass after one growth season, when compared to other fertilizer regimes.

Figure 10:
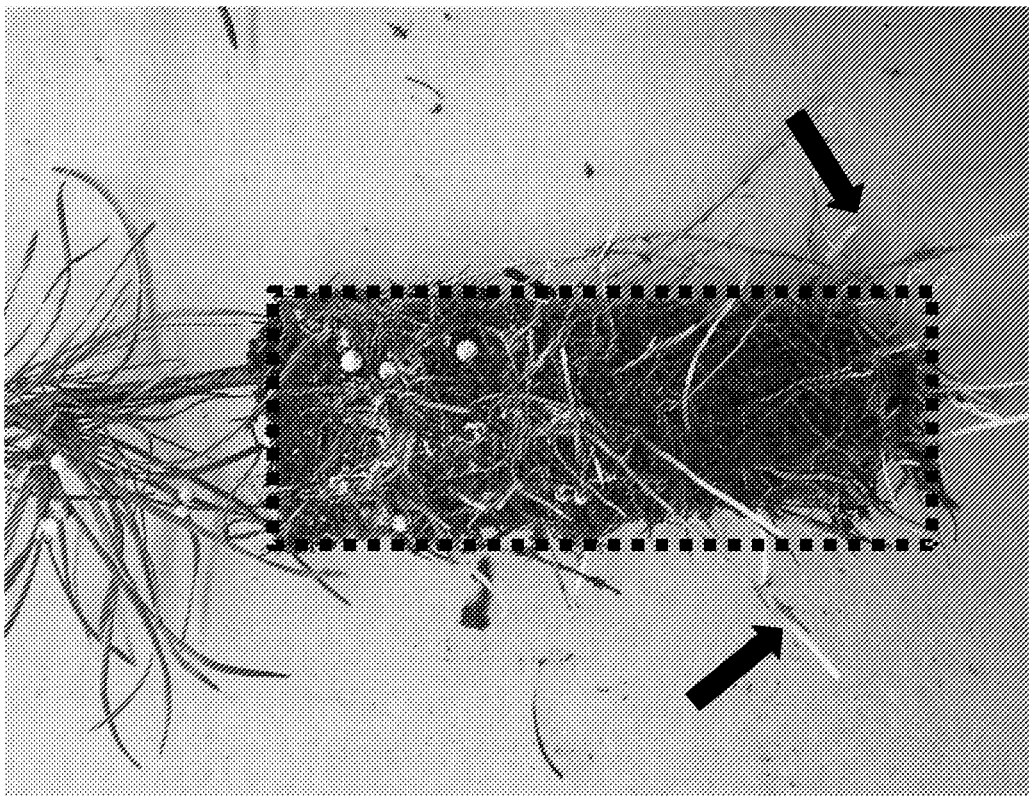
FIG. 10 shows a photo of a peat plug after growth of Pine in the field for approx. one year showing the field roots.

FIG. 10 shows a photo of a peat plug obtained after growth of Pine in the field for approx. one year. The field roots extending out of the peat obtained from the use of the present invention appear clearly.

Figure 11:
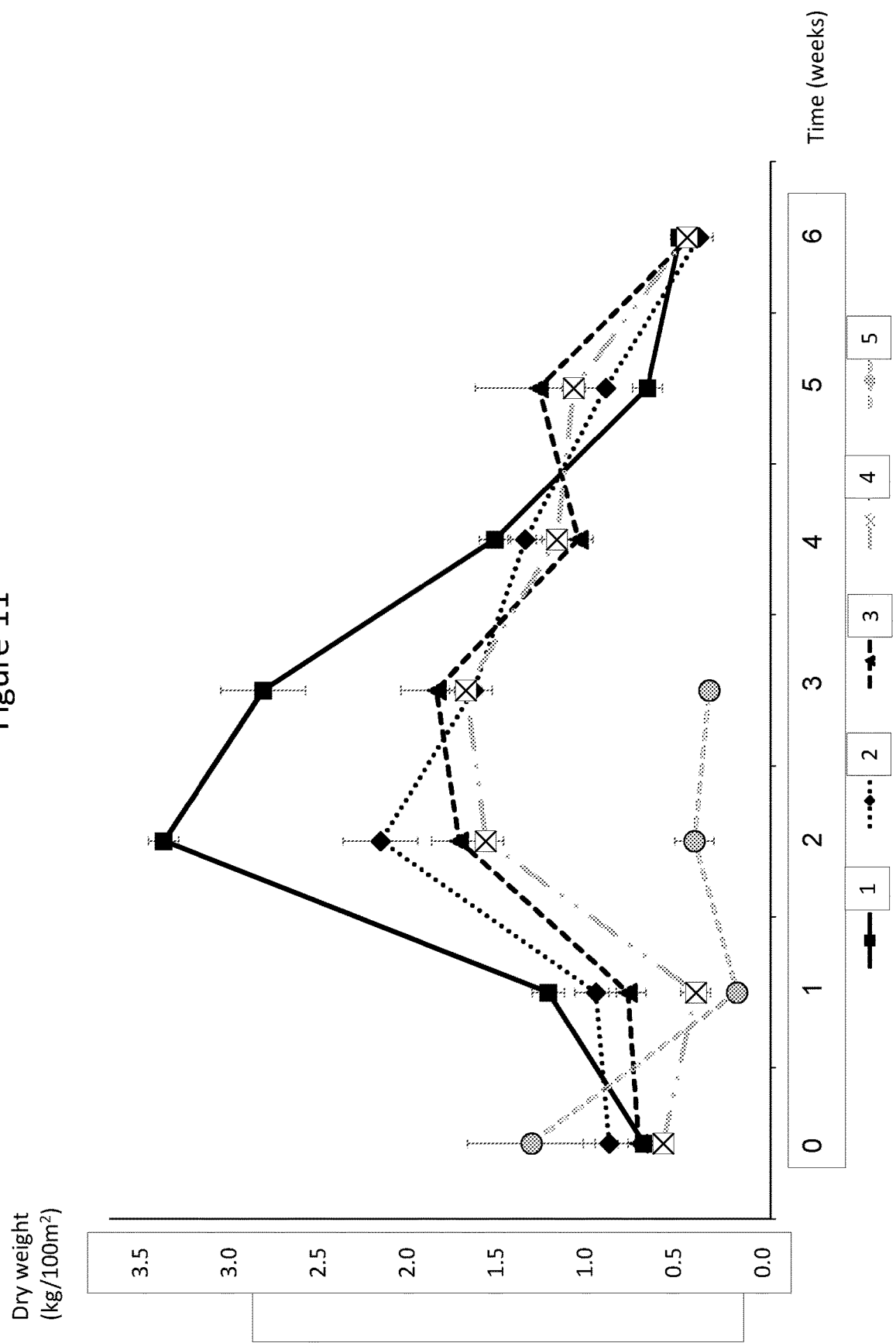
FIG. 11 shows the dry weight variations of grass clippings of fairway turf fertilized according to the invention (1) as well as with different granular prior art fertilizers (2-4), obtained in accordance with Example 10.

FIG. 11 shows grass clipping dry weights of fairway turf fertilized with different granular fertilizers in accordance with Example 10 below. The grass clipping was collected weekly to 20 mm above the sandy growth substrate over a 6-week response period to different granular fertilizers. A pre-treatment clipping dry weight established at week 0. N=4. Error bars=Standard error. X-axis represents weeks after treatment. The Y-axis shows clipping dry weight in kg/100 m$^2$. The graphs denoted 1.5 represents coated arginine monophosphate according to the invention (1); Impact CGF (comparative commercial product) (2); Premium elite (comparative commercial product) (3); N-methyl urea (4), and control (5)—see Table 3 for more details.

Figure 12:
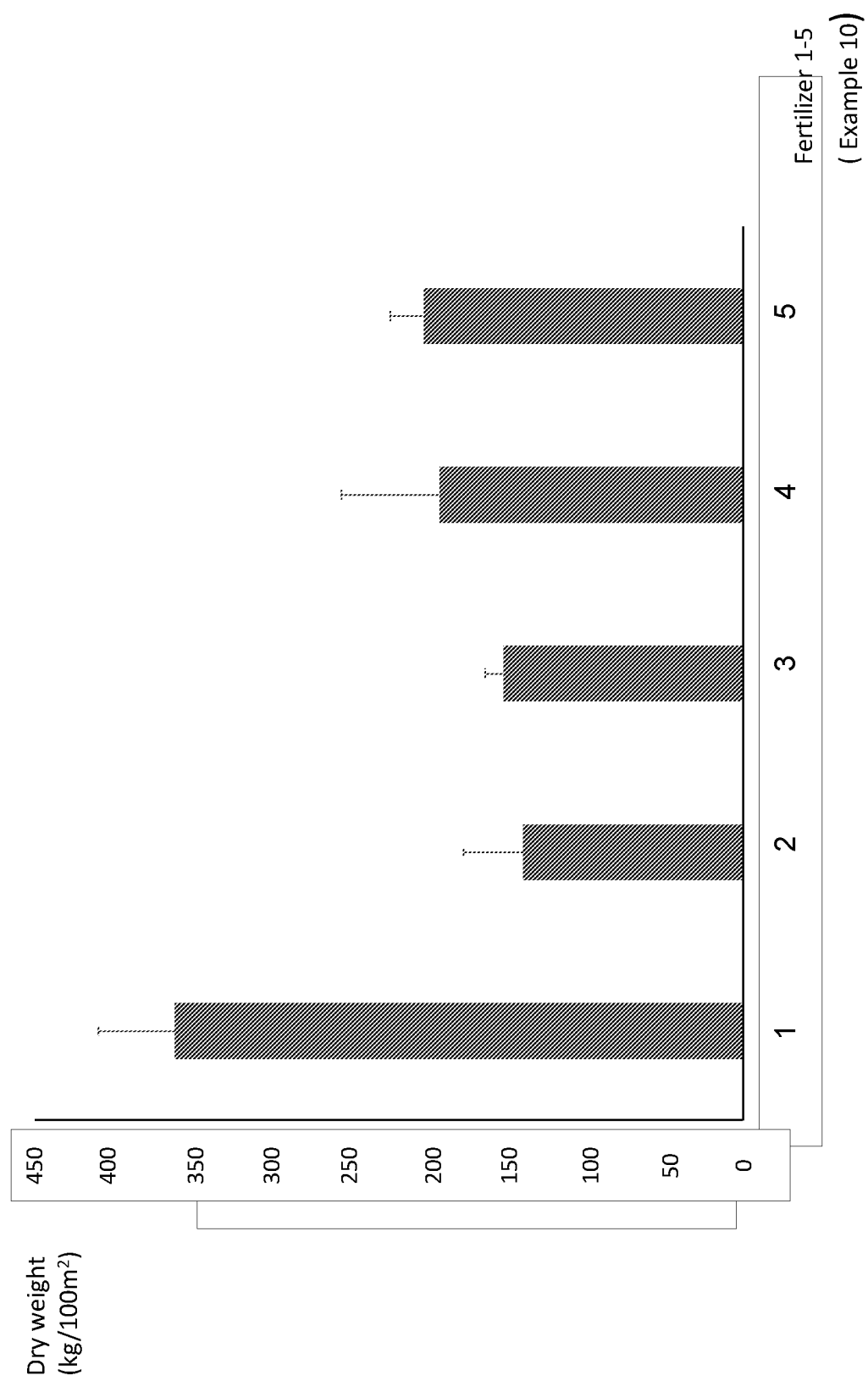
FIG. 12 shows the root biomass of the fairway turf grass after the five different treatments of FIG. 11.

FIG. 12 shows root dry weight response of fairway turf seven weeks after the five different treatments with granular fertilizers and weekly clipping to 20 mm above the sandy growth substrate period to different granular fertilizers, see FIG. 11 above and Example 10, Table 3 for treatment. Error bars=Standard error. The Y-axis shows root dry weight in kg/100 m$^2$.

Figure 13:
FIG. 13A-B shows a comparison of the growth of *Rosmarinus* (*Rosmarinus officinalis*) after 6 weeks with no fertilizer (A) and with the arginine monophosphate according to the invention (B).

FIG. 13 shows the dicotyledon herb *Rosmarinus* (*Rosmarinus officinalis*) after 6 weeks with no fertilizer (13A) and the arginine monophosphate according to the invention (13B).

EXPERIMENTAL PART

The present examples are provided for illustrative purposes and should not be construed as limiting the invention as defined by the appended claims. All references provided below and elsewhere in the present application are hereby included herein via reference.

Example 1—Preparation of Arginine Phosphate Monohydrate Crystals

The objective of this example was to prepare phosphate crystals of amino acids to be used as fertilizer for plants in accordance with the invention. Though arginine is described below, the skilled person can easily use the method for the preparation of lysine as well.

L-arginine was obtained from a commercial source. 85% orthophosphoric acid was obtained from Merck (Darmstadt, Germany). Millipore water of 18 MΩ resistivity was used to prepare the solutions.

A supersaturated solution of arginine phosphate (monohydrate) was prepared by dissolving L-arginine in purified water at 60° C. An equimolar amount of orthophosphoric acid was added whereby the solution temperature increased to about 80° C. The arginine phosphate solution was slowly cooled at a rate of approximately 5° C./hour. Nucleation of arginine phosphate occurred spontaneously at a solution temperature of about 60° C. Crystal growth continued as the temperature decreased further. After reaching a temperature of 5° C., the remaining mother liquor was poured off. The crude crystals were dried by vacuum filtration followed by drying in a heat cabinet at 35° C. for approximately 24 hours. The crude crystal yield for the first three test batches was between and 82 and 90%.

To remove soluble arginine and phosphate adsorbed on the crystal surfaces, the crystals may be washed with a small amount of cold water during the vacuum filtration step. Preliminary tests indicate that the yield of washed crystals is between 75-80%. The crystal structure of the formed crystals was confirmed by XRD analysis. The diffractogram is shown in FIG. 1.

Example 2—Growth and Germination of Pine (*Pinus sylvestris*) Seedlings with Different Fertilizers Pine seedlings were grown in unfertilized peat (80 ml per plant/pot) with 20 mg N of one of the following arginine fertilizer compositions: Arg-HCl or arginine monophosphate. The plants were grown in the greenhouse 16 h/8 h (day/night) at 23 C.° and germination was measured after 3 weeks. Plants were harvested and rinsed to remove all soil from the roots and then dried in 65 C.° for 24 h. Dry weight was measured after 5 weeks. The results are presented in FIGS. 2A-C Example 3—Field Test on Pine (*Pinus sylvestris*) with Coated Arg-HCl and Arginine Monophosphate According to the Invention 30 mg N per plant in the form of coated Arg-HCl or ArgP were mixed in peat and loaded to cassettes. Pine seeds were added and the plants were grown in greenhouses for 5 weeks with only water addition once per day and then moved outside and grown for 5 weeks more. Plants were rinsed to remove all soil from the roots and dried in 65 C.° for 24 h. Dry weight was measured. The results are shown in FIG. 4.

Example 4—Field Test with Beads Comprising Different Forms of Nitrogen

Solid arginine monophosphate was prepared. The crystals formed were grinded into smaller particles, which were mixed with binder and formed into beads comprising arginine monophosphate according to standard coating procedures.

Two additional nitrogen containing beads were included in the field test. Commercially available Arginine-HCl was treated as above to create argHCl comprising beads.

The commercial available nitrogen comprising bead to test was a coated NPK fertilizer that releases nitrogen, phosphate and potassium and trace elements over a prechosen period of time.

The amount of nitrogen was calculated for each of the three different types of beads. Beads with approximately 10 or 20 mg nitrogen was placed in the vicinity of pine seeds place in the sowing unit presented in WO2015030656 as illustrated in FIG. 3. One hundred (100) sowing units was used with the two levels of nitrogen and planted outdoors.

Results

The first comparison was made between the beads with the two arginine comprising compounds. Seeds of Scots pine (*Pinus sylvestris*) were seeded and fertilized and the germinated seedlings were counted. The germination rate was calculated and summarized in Table 1 and FIGS. 2 and 4.

TABLE 1

Germination rate with ArgP (arginine monophosphate according to the invention) and ArgHCl beads:

|  | Arginine monophosphate beads | ArgHCl beads |
|---|---|---|
| Germination rate (%) | 10 mg 78% | 10 mg 67% |
| Germination rate (%) | 20 mg ArgP 78% | 20 mg ArgHCl 68% |

Based on these results it was obvious that germination and plant formation was much better when both nitrogen and phosphorous was present in the beads.

The second comparison was made between arginine monophosphate beads according to the invention and the commercially available beads both embedded in the sowing unit as seen in FIG. 3. The sowing units were tested at a plant nursery. 19 weeks after planting, the sowing units with the arginine monophosphate beads or the commercially available coated beads, plantlets were harvested and the total dry weight was measured as well as the shoot and the root. Surprisingly, it was then noted that the total dry weight of the plantlets was significantly larger, i.e. the plant grown from the sowing unit comprising the arginine monophosphate fertilizer according to the invention was approximately 20% larger than plants grown from the sowing unit with the commercial nitrogen fertilizer used. This was even more pronounced when the dry weight of the root was measured, 50%, which is summarized in the table 2 and FIG. 4.

TABLE 2

Comparison between ArgP beads and commercially available coated nitrogen fertilizer:

|  | ArgP 10 mg N | Commercial coated nitrogen fertilizer 10 mg N |  |
|---|---|---|---|
| Dry weight shoot (g) | 0.081 | 0.074 | 9% |
| Dry weight root (g) | 0.042 | 0.028 | 50% |
| Total weight (g) | 0.123 | 0.102 | 21% |

Example 5—Toxicity Test on Pine (*Pinus sylvestris*) Seedlings with Different Coated Arginine Fertilizers Pine seedlings grown in unfertilized peat (80 ml per plant/pot) with single doses of different amounts of added nitrogen (20, 40, 80 or 160 mg N) with two different coated arginine fertilizers—Arg-HCl and arginine monophosphate according to the invention). Plants were grown in the greenhouse 16 h/8 h (day/night) 23 C.° Plants were harvested after 10 weeks, rinsed to remove all soil from the roots and dried in 65 C.° for 24 h. Dry weight was measured. The results are shown in FIG. 4.

Example 6—Preparation of Lysine Phosphate Crystals

This example shows how lysine monophosphate can be prepared. Lysine, 50 g, from Merck (Darmstadt, Germany) was dissolved in 20 mL deionized water at 80° C. which resulted in white slurry. After addition 40 mL of water, a clear viscous solution was obtained. Orthophosphoric acid, 85%, was added dropwise to the slurry, after the first added 10 mL the temperature had increased to 80° C. and a white precipitate was formed, which was dissolved when the remaining 10 mL orthophosphoric acid, 85%, were added The temperature had now increased to close to 100° C. The lysine phosphate solution was allowed to cool under continuous stirring. At approximately 65° C., crystals were formed and precipitated in the solution. The stirring was stopped and the contents in the beaker were quickly solidified into a solid white mass. The crystal material was air-dried in a fume hood for 2 days.

An XRD diffractogram was collected for the formed crystal material. The sample produced a diffractogram with several interference peaks, confirming that the material is crystalline. An elemental analysis of the crystal material showed that the nitrogen content in the sample was 11.65 wt %. The theoretical nitrogen content in lysine phosphate is 11.7 wt %. The diffractogram is shown in FIG. 6.

Example 7—Germination of Scots Pine Seeds with Lysine Phosphate

Forty pots with volume of 50 ml were filled with unfertilized peat and another set of 40 pots was filled with peat wherein 20 mg N of lysine phosphate complexes was added. The amount of nitrogen (N) was measured based on the number of atoms N in the lysine phosphate. Scots Pine seeds were sown in the pots and grown in greenhouse 16/8 h day/night, 23° C. The pots were watered two times a day with a total growth period of 8 weeks. The seedlings were harvested, the peat was washed away and the seedlings were dried and dry weight was recorded. These results as presented in FIG. 7 show that germination of pine seedlings fertilized with lysine phosphate according to the invention is an excellent fertilizer.

Example 8—Comparison of a Fertilizer Comprising a Binder and Arginine Monophosphate According to the Invention with a Conventional Liquid Arginine Comprising Fertilizer Arginine monophosphate beads which included a binder (sometimes denoted 'coated' herein) according to the invention were mixed with peat. Cassettes with 60 pots/cassette (the Starpot system, Holmen A B, Sweden) were filled with the peat mix. The amount of nitrogen, N, was calculated based on the number of atoms in the arginine phosphate beads such that each seedling got 25 mgN in each pot. A test with approximately 2000 Scots pine seeds was set up. As a reference approximately 4000 seeds were used. All cassettes with pine seeds were then transferred to a greenhouse for 5 weeks for germination of the seeds. After these weeks the test cassettes were placed outdoors for further cultivation. The test cassettes with granulated arginine phosphate were watered regularly with no addition of extra fertilizer until the end of the growing season. The reference cassettes were first treated with arGrow mix (SweTree Technologies, Umea, Sweden) during the first five weeks of germination and then they were further fertilized with liquid arGrow (SweTree Technologies, Umea, Sweden) complete until harvesting. The use of arGrow mix and arGrow complete was done according to the recommendations by the manufacturer. After two and a half month the seedlings were harvested, the peat was washed away and the seedlings were dried and the dry weight was recorded. Total biomass, shoot and rot weight were also measured and the mean was calculated and is presented in FIG. 8.

The results may be summarized in the use of granulated arginine phosphate produced seedling with higher biomass and a larger portion of shoot, assessed by dry weight, as compared to control. An advantage with the use of the beaded format (granulate) is that the fertilizer may be added from the start, and no further addition of fertilizer is needed. This is a great advantage especially in larger plantations, and both simplifies the process and reduces the costs of handling of plants.

Example 9—Treatment of Scots Pine, Norway Spruce and Contorta Pine with Granulated Arginine Phosphate According to the Invention Scots pine, Norway spruce and Contorta pine seedlings were raised according to the reference method described in Example 8, One third of the seedling did not get any fertilizer, one third of the seedling got coated arginine-HCl beads and one third of the seedling got the coated arginine phosphate beads supplied to the rots of seedlings and then planted. The total amount of nitrogen was calculated to be 28 mg N per seedling. The plants were harvested after one growth season and the dry biomasses of shoot, root and total biomass were recorded. At the same time the number of "field roots" was counted. "Field roots" is defined as roots grown in the field outside the peat plug from the pot, see FIG. 10 for an example of "field roots". Arrow shows "field roots". It was surprisingly found that granulated arginine phosphate beads supplied to the roots of seedlings when planted had a long term effect on the growth, measured as increase in biomass on the three different angiosperm trees. These growth improvements are summarized in FIG. 9A-C.

Furthermore, it was surprisingly found that the field roots significantly increased in number when arginine phosphate beads supplied to the rots at the planting occasion. For Scots pine, the number of field roots increased with 68%, for Norway spruce they increased with 62% and for Contorta pine they increased with 115% when compared to reference plants. It was also noted that arginine phosphate beads supplied to the roots had the greatest effect on "field root" number after approximately one year, which may be an important factor when a new plant should be established. The ArgHCl did not have this effect on the root development.

Example 10—Fairway Turf Response to Coated Arginine Monophosphate

Turf establishment rate from seed is enhanced in response to amino acid based fertilizer suggesting that granular arginine monophosphate may support effective growth of grass species.

In standard greenhouse conditions, 16 h days supplemented, 20-25° C., with artificial light and 8 h night at 15° C. a grass seed mix of 70% Festuca rubra spp. and 30% Poa pratensis, typically used on golf fairways in temperate and cold climates (referred to as "fairway turf") was established at a seeding rate equivalent to 3 kg seed/100 m$^2$ in 3 Liter pots containing sand with approximately 10% organic matter. In order to support the establishment of full turf coverage in all pots a liquid $NH_4NO_3$ fertilizer was applied at a rate 0.15 kg N/100 m$^2$ six weeks after seeding. Subsequently, four weekly cut-regrowth cycles were performed prior to the commencement of the experimental period where the grass was clipped to 20 mm and the clippings removed.

A single treatment of coated arginine monophosphate crystals was made at a rate equivalent to 0.5 kg N/100 m$^2$. References treatments matched for total nitrogen level were applied using either a coated ammonium/urea-based commercial product formulated for use on golf fairways, a non-coated methylated urea-based commercial product formulated for use on golf fairways, or chemically pure N-Methylurea. A nil control was also established which did not receive a granular fertilizer treatment during the experimental period. Treatments were replicated four times.

TABLE 3

Fertilizer treatments:

| Fertilizer | Treatment reference | N-P-K | Nitrogen form | Coating | Nitrogen content (w/w %) |
|---|---|---|---|---|---|
| Coated arginine monophosphate | 1 | 56-31-0 | Arginine monophosphate | PVA | 7.3 |
| Impact CGF* | 2 | 25-5-11 | Urea, ammonium 10.4% (PCSU), 13.4% non-coated urea, 1.2% ammonium | polymer coated sulphur urea (PCSU) and non-coated | 25 |
| Premium elite** | 3 | 22-3-16 | Methylated urea | Non-coated | 22 |
| N-Methylurea | 4 | 1-0-0 | Methylated urea | Non-coated | 37.8 |
| Nil N control | 5 | — | — | — | 0 |

*Impact CGF is commercial fertilizer sold by Indigrow (UK) Ltd.
**Premium elite is commercial fertilizer sold by Skåne frö AB, Sweden.

Grass clippings were collected to 20 mm above the sandy growth substrate and oven dried at 50° C., once prior to fertilizer application (week 0) and then weekly over the subsequent six weeks (week 1-6). Roots were washed and oven dried (at 50° C.) seven weeks after granular fertilizer treatment.

The results of this example show that fairway turf exhibited a general increase in production of above ground biomass in response granular nitrogen additions (FIG. 11). With the exception of coated arginine monophosphate where a significant increase in biomass production was observed in the first week after treatment (p-value=0.0138), significant increases in response to all other fertilizer treatments were first observed in the second cut-regrowth cycle. Peak production levels were generally reached in the second or third cut-regrowth cycle with coated arginine monophosphate achieving a significantly higher above ground biomass production level in both cycles. Above ground biomass production for a cut-regrowth cycle declined below pre-treatment levels for all fertilizer treatments in the sixth cut-regrowth cycle.

A leaf burn stress response commonly referred to as "scorching" was observed in response to uncoated N-Methylurea, Table 3, treatment reference 3 and 4 but not arginine monophosphate or coated methyl urea, Table 3, treatment reference 2. Seven weeks after fertilizer treatment followed by weekly cut-regrowth cycles root biomass was significantly greater in response to coated arginine monophosphate compared to the reference fertilizer treatments and the nil N control, FIG. 12.

Example 11—Use of the Invented Fertilizer Comprising Arginine Monophosphate on Herbs Seeds of the herb Rosmarinus, Rosmarinus officinalis, were sown in a pot with ordinary planning soil, one with no added fertilizer and the other one with the arginine monophosphate fertilizer according to the invention. The total amount of nitrogen was 30 mg. Seeds and plants were watered regularly, and after 6 weeks it was clearly seen that the invented fertilizer improved growth and vigour of the Rosmarinus plants. Based in this results and the previous examples it can be concluded that the invented arginine monophosphate fertilizer may improve the growth and vigour of all plants tested, both in greenhouse and outdoors. Furthermore, it can be used on any type of plants, coniferous tree, dicotyledons, and monocotyledons.

The invention claimed is:

1. A fertilizer comprising L-arginine, which fertilizer is a solid composition wherein a substantial portion of the L-arginine content is present as L-arginine monophosphate, and which fertilizer is comprised of a plurality of aggregates, each presenting an outermost layer, the composition of which differs from a composition enclosed by said layer.

2. A fertilizer according to claim 1, which further comprises at least one binder.

3. A fertilizer according to claim 1, which further comprises a binder that comprises mineral(s) and/or natural or synthetic polymers.

4. A fertilizer according to claim 1, which further comprises a binder selected from the group consisting of polymers, calcium-containing salts, and calcium-containing minerals.

5. A fertilizer according to claim 1, wherein the aggregates are each comprised of particles comprising the L-arginine aggregated together by mixture with a binder.

6. A fertilizer according to claim 1, wherein the fertilizer comprises the monophosphate of L-arginine, and no other phosphate(s).

7. A method of enhancing the growth of a plant, which method comprises making the a solid fertilizer according to claim 1 available to a seed or plant.

8. A method according to claim 7, wherein the growth of plant roots is enhanced.

9. A method according to claim 7, wherein the availability of nitrogen and optionally other nutrients to said plant is controlled by arranging the seed in a growth-supporting material to which the fertilizer is added.

10. A method according to claim 9, wherein the growth-supporting material comprises mineral, compressed soil, or compressed peat.

11. A fertilizer comprising L-arginine, which fertilizer is a solid composition wherein a substantial portion of the L-arginine content is present as L-arginine monophosphate and which fertilizer is comprised of a plurality of aggregates, each aggregate comprising particles of L-arginine monophosphate aggregated together by mixture with a binder and surrounding nuclei.

12. A fertilizer according to claim 11, wherein the binder comprises a synthetic polymer.

13. A fertilizer according to claim 11, wherein the binder comprises a natural polymer.

14. A fertilizer according to claim 11, wherein the binder comprises a sugar, a starch or a carbohydrate.

15. A fertilizer according to claim 11, wherein the binder comprises a water-soluble polymer.

16. A fertilizer according to claim 11, wherein the binder comprises polyvinyl alcohol.

\* \* \* \* \*

UNITED STATES PATENT AND TRADEMARK OFFICE
CERTIFICATE OF CORRECTION

PATENT NO. : 11,591,271 B2
APPLICATION NO. : 16/301130
DATED : February 28, 2023
INVENTOR(S) : Torgny Näsholm et al.

It is certified that error appears in the above-identified patent and that said Letters Patent is hereby corrected as shown below:

In the Claims

Claim 7, Column 14, Line 44, after "the" delete "a".

Signed and Sealed this
Eighteenth Day of April, 2023

Katherine Kelly Vidal
*Director of the United States Patent and Trademark Office*